United States Patent [19]
McKenzie

[11] 4,279,531
[45] Jul. 21, 1981

[54] END ASSEMBLY FOR WIRE STRAND

[75] Inventor: Kenneth G. McKenzie, Hamilton, Canada

[73] Assignee: Greening Donald Co. Ltd., Hamilton, Canada

[21] Appl. No.: 104,945

[22] Filed: Dec. 18, 1979

[30] Foreign Application Priority Data

Dec. 22, 1978 [CA] Canada .................... 318499

[51] Int. Cl.³ ............................. F16G 11/05
[52] U.S. Cl. ................................. 403/267; 403/275
[58] Field of Search .............. 403/275, 281, 268, 267; 24/122.3, 122.6

[56] References Cited

U.S. PATENT DOCUMENTS

| | | | |
|---|---|---|---|
| 1,214,709 | 2/1917 | Orr | 403/275 |
| 1,577,003 | 3/1926 | Sunderland | 24/122.3 |
| 2,341,922 | 2/1944 | King et al. | 403/275 X |
| 3,475,795 | 11/1969 | Youngblood | 24/122.6 |

FOREIGN PATENT DOCUMENTS

| | | |
|---|---|---|
| 428000 | 10/1945 | Canada . |
| 646293 | 6/1962 | Canada . |
| 658261 | 4/1963 | Canada . |
| 772861 | 3/1967 | Canada . |
| 971337 | 11/1975 | Canada . |
| 514487 | 5/1955 | Canada . |
| 660357 | 2/1964 | Italy .................... 24/122.6 |

Primary Examiner—Andrew V. Kundrat
Attorney, Agent, or Firm—Rogers, Bereskin & Parr

[57] ABSTRACT

The invention provides an insert for use in retaining an end portion of a cable in a socket. The insert has first and second ends and defines a central opening extending between the ends. A portion of the opening adjacent the first end of the insert has a diameter which forms a loose fit on the center wire of the cable, and the remainder of the opening is at least as large as this diameter so that during assembly a filler material can be entered into space around the center wire in the opening. The invention also provides an end assembly on a cable using the insert.

7 Claims, 8 Drawing Figures

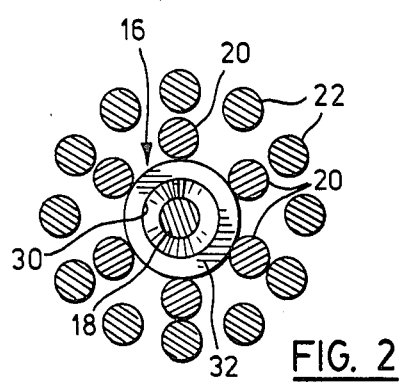
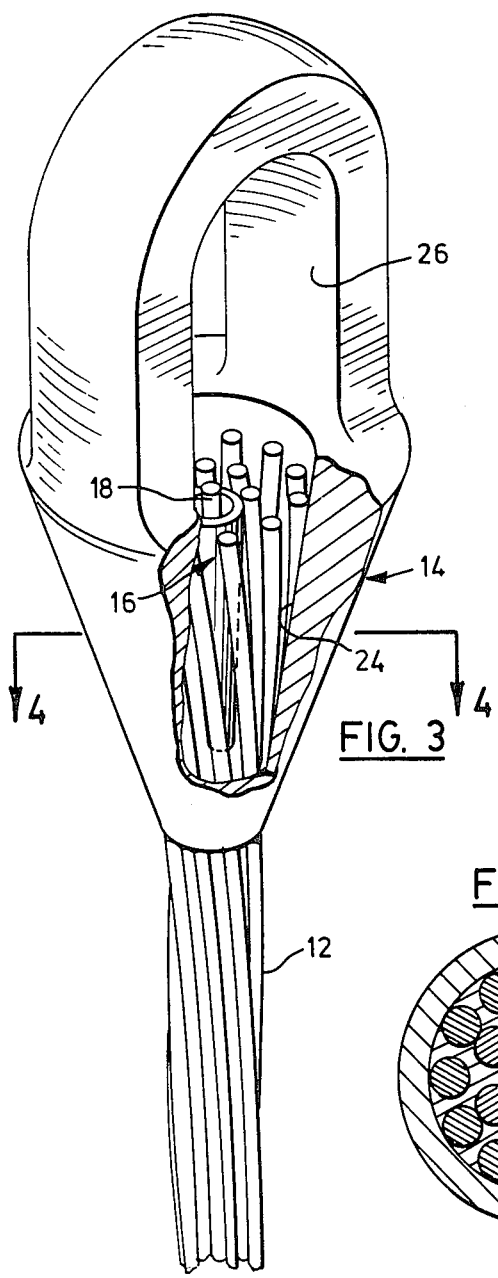
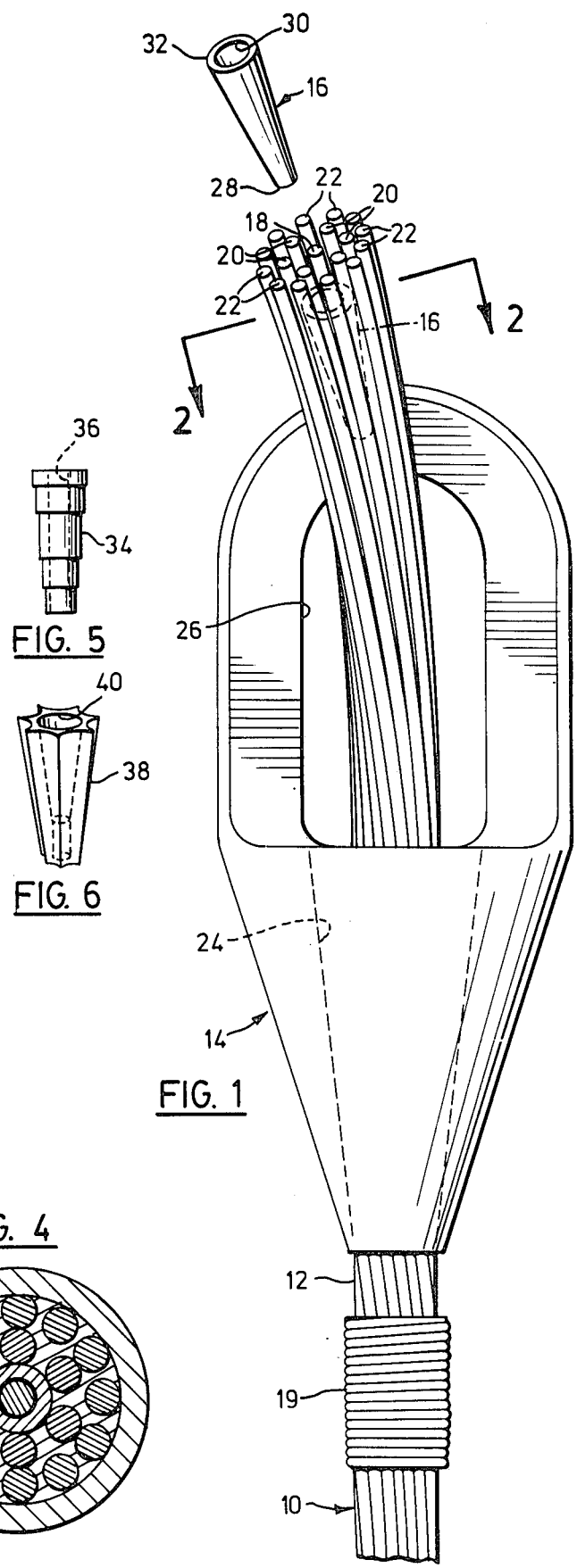

END ASSEMBLY FOR WIRE STRAND

This invention relates to an end assembly for cables of the type which are made up of a plurality of wires and more particularly to an insert for use in such an assembly.

The word "cable" is used in this description and in the claims to describe a structure made up of a plurality of wires, one of the wires being a centre wire which is straight and the other wires being wrapped helically about the centre wire in layers.

Cables are used in many structures as tensile elements. In every instance it is necessary to have an end fitting of some kind on the cable to anchor the end of the cable or otherwise attach it to a further element. Such assemblies must be capable of withstanding the maximum tensile load for which the cable is designed. Further, the method of preparing the assembly should be as fool-proof as possible and require a minimum of quality control.

One method of preparing an end assembly involves the use of nails which are entered between individual wires from an end of the cable to separate the wires. Subsequently, this end portion of the cable is contained in a socket and the interstices are filled with zinc. While such an end structure is capable of transmitting the necessary tensile loads, it can not be inspected after assembly and it is possible for the assembly to be done using fewer than the required number of nails resulting in a weaker structure.

The present invention provides an insert for engagement about a centre wire of a cable to provide an improved connection with a socket and also to minimize the need for quality control in such assemblies.

Accordingly, in one of its aspects the invention provides an insert for use in retaining an end portion of a cable in a socket. The insert has first and second ends and defines a central opening extending between the ends. A portion of the opening adjacent the first end of the insert has a diameter which forms a loose fit on the centre wire of the cable and the remainder of the opening is at least as large as this diameter. Consequently during assembly a filler material will enter space around the centre wire in the opening.

In another of its aspects the invention provides an end assembly on a cable using the aforementioned insert.

These and other aspects of the invention will be better understood with reference to the drawings, wherein:

FIG. 1 is a side view of a socket containing an end portion of a cable which is about to receive an insert according to a preferred embodiment of the invention;

FIG. 2 is a sectional end view on line 2—2 of FIG. 1;

FIG. 3 is a perspective view with a portion of the socket broken away after withdrawing the end portion and insert into the socket;

FIG. 4 is a sectional view on line 4—4 after completion of the end assembly; and FIGS. 5 and 6 show two alternative embodiments of insert.

Figure 7:
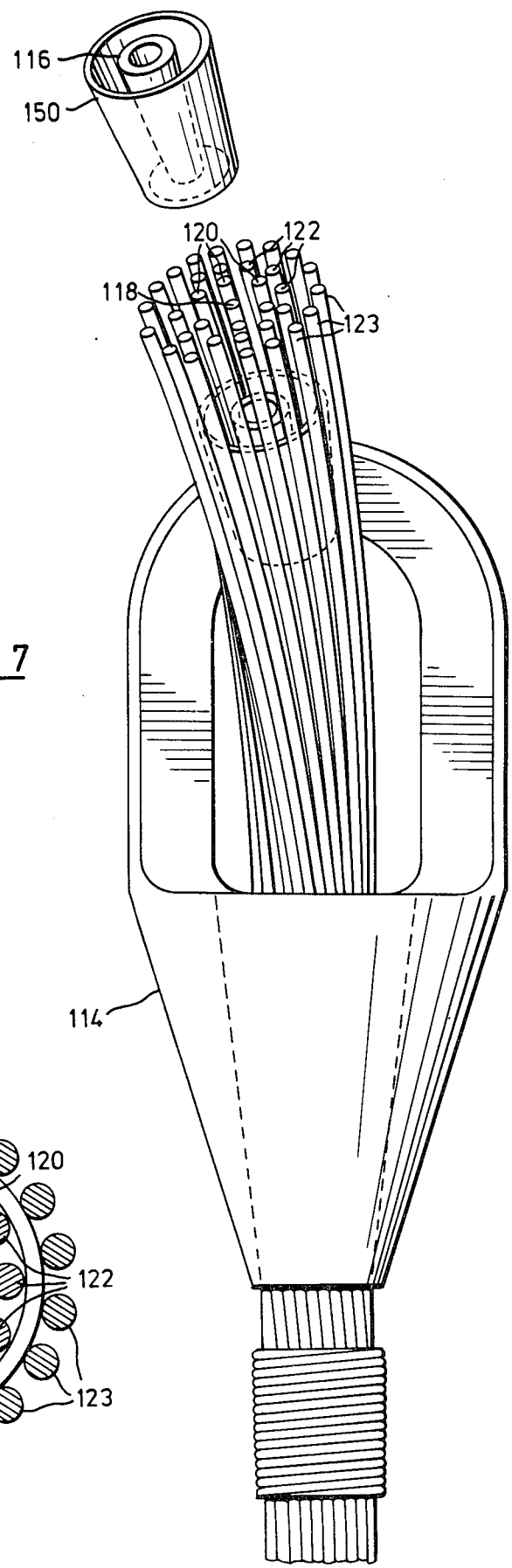
FIGS. 7 and 8 illustrate a further embodiment of the invention which may be utilized with a cable having a greater diameter.

As will be seen in FIG. 1 a typical cable 10 has an end portion 12 inserted through a socket 14 and projecting above the socket to receive an insert 16. The end portion 12 is separated from the main body of the cable by a serving 19 which is wrapped about the cable to prevent separation of the individual wires making up the cable. As seen at the top of FIG. 1, these wires consist of a centre wire 18 about which an inner layer of wires 20 is wrapped helically and in turn this layer of wires is contained in an outer wrapping of wires 22. The centre wire 18 is straight and receives the insert 16 as will be described.

After applying the serving 19 on the cable 10, the end portion 12 is slipped through a conical opening 24 in the socket 14 and angled sideways out of an eye 26 of the socket. The cable is placed in this position to provide access for engaging the insert 16 on the end wire 18.

After positioning the cable as shown in FIG. 1, a pointed tool somewhat like an ice pick is used to spread the wires slightly to provide initial entry for a smaller first end 28 of the insert on to the centre wire 18. This wire is then engaged in a central opening 30 of the insert. It will be seen from FIG. 1 that the outer surface of the insert is conical and that a second end 32 is larger than the first end 28. Consequently the insert must be driven into the end portion until it takes up the position shown in ghost outline in FIG. 1. At this point it is contained within the end portion of the cable and the second end of the insert is about half an inch past the end of the cable. This placement of the insert causes the wires to fan out as seen in FIGS. 1 and 2.

It will be seen from FIG. 1 that the opening 30 in the insert 16 is in two parts. This can also be seen in FIG. 2. A part of the opening 30 adjacent the first end 28 is cylindrical and proportioned for sliding over the centre wire 18 with enough space about the wire to receive filler material. However, the remainder of the opening 30 adjacent the second end 32 is conical. The space so formed between the centre wire 18 and the wall of the opening receives filler material as will be explained to lock the centre wire to the insert. FIG. 2 illustrates the substantially uniform distribution of the wires 20,22 relative to one another and to the centre wire 18. This enhances the strength of the connection between the socket and the cable after the assembly has been completed.

The next step in the assembly is shown in FIG. 3. Here the cable has been pulled away from the socket until that part of the end portion which contains the insert 16 is positioned within the conical opening 24 of the socket 14. It will be evident that because the cable contains the insert it will be impossible to pull the remainder of the cable out of the socket. However, it is not sufficient to simply rely on the positioning of the insert to retain the end of the cable in the socket. The final assembly must be capable of transmitting tensile forces between the cable and the socket. Consequently a filler material is used to hold the individual wires in position in the socket and to prevent separation caused by rotational or compressive forces.

In this instance the filler material used is zinc. First the socket is preheated and molten zinc is then poured through the eye 26 of the socket into the conical opening 24 where it fills the interstices between the wires and the insert 16. The resulting assembly has a cross section such as that shown in FIG. 4 where the zinc can be seen between the wires and insert. However, it is also important to appreciate that in the preferred embodiment, the part of the opening 30 (FIG. 1) adjacent end 32 of the insert also contains zinc to lock the centre wire 18 to the insert. Consequently, tensile forces in the cable can be distributed among all of the wires including the centre wire because the wire is also a load bearing wire.

It will be evident that some variation can be made within the scope of the invention. For instance, the filler material may be any suitable metal having a relatively low melting point or a suitable synthetic plastic material could be used. Also, the shape of the insert can be varied provided that it causes the necessary spreading or fanning of the wires. Two possible variations are shown in FIGS. 5 and 6. In FIG. 5 the outer surface of an insert 34 is stepped to provide similar results.

In FIG. 5 the insert has a centre opening 36 which is cylindrical for engagement over a centre wire. In this embodiment because the opening 36 is cylindrical there will be minimal load transfer from the centre wire to the end assembly. While this may be acceptable in some circumstances, normally it would be preferred to use an opening such as the opening 30 shown in FIG. 1.

The embodiment shown in FIG. 6 has a centre opening 40 which is similar to the opening 30 shown in FIG. 1 but differs in that the outer surface of the insert is tapered and ribbed longitudinally. The number of ribs corresponds to the number of wires 20 (FIG. 2) so that when the insert is engaged the ribs on the insert enhance the symmetrical positioning of the wires 20. Also, the insert provides a larger surface area than the insert 16 (FIG. 1) which can be advantageous from the standpoint of bonding with the filler material.

It will be evident that the socket 14 (FIG. 1) is typical of different fittings which can be used on the end of the cable 10 although such a socket is commonly used with cable. However, any fitting having an opening such as the opening 24 and which provides access for engaging the insert 16 in the end portion of the cable can be attached according to the invention.

The cable shown in FIGS. 1 and 2 comprises a central wire and two annular arrays or rows of helically wound wires. In larger diameter cables the size of the wires is not often increased but the number of rows of wires may be increased. Accordingly, where a cable having a greater tensile strength is required it may be desirable to utilize a cable having three or more annular arrays or rows of wires all helically wound about a central wire. In such a case it may be desirable to use an additional insert in addition to the first insert illustrated in FIGS. 1 and 2.

Accordingly, where a cable comprises a central wire and at least three annular arrays of wires helically wrapped about the central wire the invention may advantageously embody a second insert. The second insert comprises a centrally extending opening which preferably has a diameter at least large enough to accommodate the first insert and at least two rows of helically wound wires.

This embodiment of the invention will now be discussed in association with FIGS. 7 and 8 which illustrate a cable having three annular arrays of wires.

Figure 8:
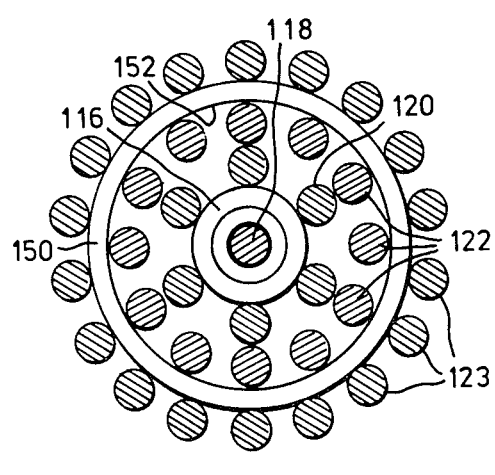

As is best seen in FIG. 8 the cable comprises a central wire 118, a first annular array of wires 120, a second annular array of wires 122 and a third annular array of wires 123. Insert 116 accommodates the central wire 118 in the manner described above with reference to FIGS. 1 and 2. Second annular insert 150 comprises a central opening 152. The central opening 152 has a diameter sufficiently large to accommodate the widest section of insert 116 and in addition, the wires of helically arranged arrays 120 and 122.

The assembly is assembled similar to that described hereinabove with reference to FIGS. 1 and 2. The cable is passed through socket 114 as illustrated in FIG. 7 and the various wires are spread apart using the tool hereinabove referred to. Insert 116 may be then passed over central wire 118 as described above. Second insert 150 is then passed over the insert 116 and over each of the wires in the annular array 120 and 122 and inside the annular array of wires 123. The entire cable end is then moved into the socket and the filler material is then poured into the socket to fill all of the interstices between the wires and between the first and second inserts. The diameter of the central opening of the second insert is a matter of choice. The diameter may be chosen such that the second insert accommodates only the first insert and the first annular array. However, it is suggested that a more efficient system involves accommodating the first insert and the first two annular arrays. With this preferred system the third annular array would be accommodated on the outside surface of the second insert. Where cables are used having a much greater number of annular arrays of helically wound wires it may be conceivable that a third or further inserts can be used depending on the number of annular arrays comprising the cable.

I claim:

1. An assembly comprising:
   a cable having a centre wire and a plurality of wires wound helically about the centre wire in layers, the cable having an end portion;
   a serving wrapped about the cable and defining the limit of the end portion;
   a socket having a conical opening containing a part of the end portion, the opening diverging outwardly away from the serving;
   a conical insert positioned in the end portion and having a conical central opening said opening diverging outwardly away from the serving and containing only the centre wire and a filler metal; and
   a filler material set in the interstices between the wires and the insert inside the socket.

2. An assembly as claimed in claim 1 in which the central opening of the insert is in two parts, a first part nearest the serving being cylindrical and forming a loose fit on the centre wire, and a second part remote from the serving being larger than the diameter of the first part.

3. An assembly claimed in claim 1 in which the insert defines longitudinally extending ribs located between wires in the end position.

4. A conical insert for use in attaching a socket to an end portion of a cable made up of a plurality of similar wires, the insert having first and second ends and defining a central conical opening extending through the insert between these ends, a portion of the opening adjacent a first end of the insert being of a diameter which forms a loose fit on the centre wire of the cable and the remainder of the opening (being at least as large as said diameter) diverging outwardly away from said first end so that during assembly a filler material will enter space around the centre wire in the opening.

5. An insert as claimed in claim 4 in which the insert defines longitudinally extending ribs located between wires in the end portion.

6. A method of engaging an end portion of a cable defined by a serving into a socket having a conical opening diverging away from the serving, the method comprising the steps:

moving the end portion of the cable through the opening in the socket in the direction of divergence of the opening;

isolating the centre wire at the exposed end of the end portion;

engaging a conical insert over the centre wire, the insert having a conical opening for receiving the centre wire;

moving the socket along the cable until the end portion containing the insert is contained in the socket; and pouring a molten material into the interstices between the wires and the insert in the socket and into the space between the central wire and the opening in said insert and allowing the material to harden thereby retaining the cable in the socket for transmission of tensile forces.

7. An assembly comprising:

a cable having a central wire and a plurality of wires wound helically about the central wire in annular layers, the cable having an end portion;

a serving wrapped about the cable and defining the limit of the end portion;

a socket having a conical opening containing a part of the end portion, the opening diverging outwardly away from the serving;

a first insert positioned in the end portion and having a central opening containing the centre wire;

a second insert positioned in the end portion and having a central opening containing said first insert and a plurality of said wires and a filler material set in the interstices between the wires and said inserts inside the socket;

said second insert comprising a central opening large enough to accommodate said first insert and at least two of said annular layers of said wires;

said cable further comprising at least one more annular layer of helically wound wires than is accommodated by said second insert.

* * * * *